Nov. 4, 1952    B. AMES    2,616,839
APPARATUS FOR DISTILLING BY RADIANT ENERGY
Filed July 13, 1948
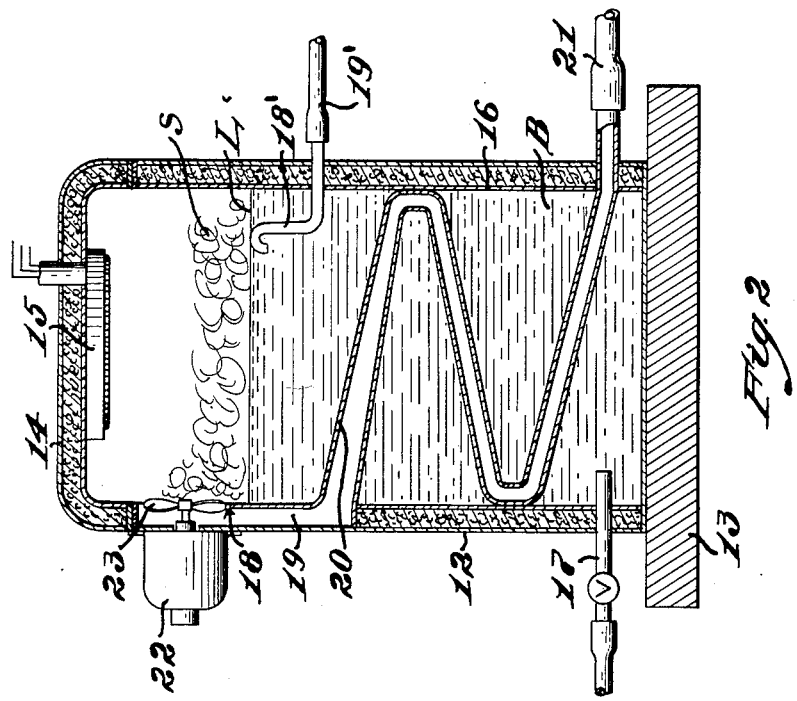
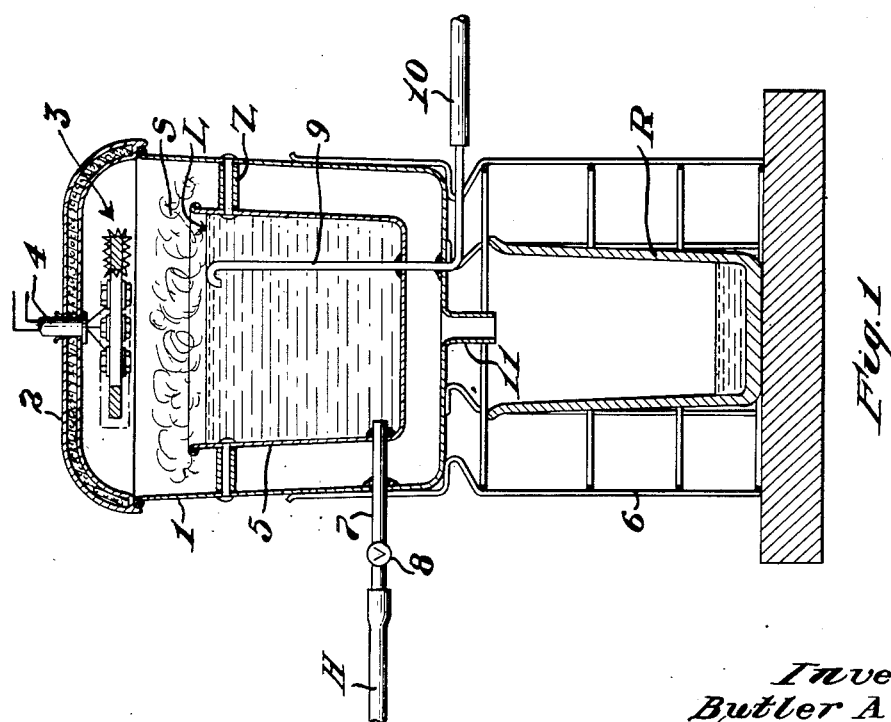
Inventor
Butler Ames
by Roberts Cushman Graves
Att'ys Patented Nov. 4, 1952

2,616,839

UNITED STATES PATENT OFFICE 2,616,839

APPARATUS FOR DISTILLING BY RADIANT ENERGY

Butler Ames, Boston, Mass.

Application July 13, 1948, Serial No. 38,398

1 Claim. (Cl. 202—187)

This invention pertains to distilling apparatus wherein radiant electrical energy is employed in a novel way for evaporating the liquid. While of broader utility, the invention finds a highly useful embodiment in a still of portable type for domestic use in the production of potable water from a supply which, for one reason or another, is not desirable for human use.

A principal object of the invention is to provide a still having very high thermal efficiency and which may be operated from the usual house lighting circuit. A further object is to provide a portable still of continuous type designed to be connected to a supply and to operate as long as may be desired without attention from the user. A further object is to provide a still wherein radiant energy is employed in a novel manner for evaporating the liquid. A further object is to provide a still of inexpensive construction and which may be made in a size suitable for domestic use and installed without recourse to the services of a plumber or other skilled worker. A further object is to provide a still of small external dimensions but of high capacity. A further object is to provide a novel method of distilling whereby the heat energy supplied is used in a most efficient way. Other and further objects and advantages of the invention will be pointed out in the following more detailed description and by reference to the accompanying drawings wherein:

Fig. 1 is a diagrammatic, diametric section through a still of simple type designed for domestic use and of portable character; and Fig. 2 is a similar diametrical section illustrating a still of a type suitable for permanent installation.

Referring to the drawings and particularly to Fig. 1, the improved still of the present invention comprises an outer receptacle 1 having a cover 2. This outer receptacle may conveniently be a cooking kettle of commercial type used for domestic cooking. An ordinary cooking kettle of eight quart capacity serves very well for the purpose. This kettle or receptacle 1 may be of any of the usual materials used for domestic cooking utensils, although stainless steel is highly desirable by reason of its good appearance and corrosion resistance. Within the cover 2 there is mounted an electrically energized heating unit 3 which may, for example, be of the kind more fully described in my United States Patent No. 2,300,837, dated November 3, 1942, designed to deliver glowing radiant heat energy downwardly into the body of the receptacle 1. A flexible conductor cord 4 leads to the heating unit 3 and is designed to be plugged into a convenient source of electrical energy.

Within the receptacle 1 there is arranged an inner container 5 which, if desired, may likewise be a cooking kettle or pot of commercial size. This inner container 5 is of a diameter and height somewhat less than those of the outer receptacle 1 so that when properly arranged in concentric relation within the outer receptacle there is a space between the outer and inner receptacles, both at the sides and bottom. The relative sizes of the inner and outer kettles should be such as to leave a space between them, ranging from ⅛ to ½ inch in width. The inner container 5 should have thin walls of a material which conducts heat very readily, for example, it may be of stainless steel or aluminum. This inner kettle or container 5 is arranged within the outer receptacle 1 and held in proper spaced relation to the latter by suitable spacer devices Z of any appropriate type, for example rivets with spacer sleeves slipped over them, or brackets of any appropriate type which may be welded or riveted to the respective outer and inner parts 1 and 5. The height of the inner container 5 is such that its rim is below the rim of the outer receptacle 1 so that the space S above the inner container 5 and within the cover 2 freely communicates with the space between the outer and inner members 1 and 5. Preferably the cover 2 is double walled and insulated, and since the outer receptacle 1 is spaced from the inner receptacle, the outer receptacle constitutes, in effect, an insulating jacket for the inner container.

Preferably a suitable base or stand 6 is provided, this stand being of any desired construction, for example stiff wire, perforated sheet metal or the like, and is arranged to support the assembled parts 1 and 5 in elevated position above a support, for example the top of the table. A water supply pipe 7 extends through an aperture in the lower part of the receptacle 1 and through the wall of the container 5, being welded or otherwise connected leaktight to each vessel. A valve 8 of any suitable type may be provided for regulating the amount of water admitted through the pipe 7. Water may be supplied to pipe 7 through a flexible hose H or in other appropriate manner.

Preferably a vertical stand pipe 9 is arranged within the container 5, having a bent upper end and so arranged as to maintain a substantially constant level L of the water within the container 5. This stand pipe extends down leaktight through aligned openings in the bottoms of the vessels 5 and 1, and having its lower end connected to a flexible drain hose 10 or other discharge conduit.

A delivery pipe 11 extends through an opening in the bottom of the receptacle 1 and communicates at its upper end with the space between the bottoms of the receptacle 1 and the container 5. The delivery pipe 11 is connected leaktight to the kettle 1.

In the operation of the device the pipe 7 is connected to a suitable source of supply, the lower end of the stand pipe 9 is connected to the conduit 10 leading to a drain, and a suitable receptacle R for the distilled water is placed in position to receive the water from the delivery pipe 11. The heating unit 3 is then connected to a source of electrical energy and the glowing radiant energy from this heating unit, impinging upon the upper surface of the body of liquid in the container 5, rapidly vaporizes the surface layer of liquid but without substantially raising the temperature of the body of liquid in the container. As the vapor rises from the surface of the liquid it moves radially outward and down into the space between the parts 1 and 5 where it comes into heat-exchange relation with the air at the outside of the receptacle 1 and with the body of liquid within the container 5. Since the atmospheric air outside the receptacle 1 and the body of liquid within the container 5 are both below the temperature of the vapor, the latter is rapidly condensed and, flowing down, passes out through the pipe 11 and is collected in the receptacle R. The heat of condensation of the vapor is imparted to the body of water in the container, so that the heat supplied is used in the most effective manner. By proper adjustment of valve 8 the temperature of the water in the lower part of the container remains substantially constant. With an apparatus of the size above suggested, and with electrical energy supplied from an ordinary lighting circuit, the apparatus will deliver as much as six quarts of distilled water in an hour, this rate of delivery being far higher than that of ordinary distilling apparatus wherein heat is applied to the bottom of the body of liquid to be distilled, and distillation involves the heating of the entire body of water to the boiling temperature.

In the arrangement shown in Fig. 2, the outer receptacle or jacket 12, which may be of substantial size, for example several feet in diameter, is mounted upon a base 13 of appropriate type and is provided with a cover 14 which is preferably of double walled construction, having insulation between the inner and outer walls. A heating unit 15 is arranged within the cover. This heating unit may be of larger capacity than that of the device of Fig. 1 although it is preferred to use a heating unit such as may be supplied with current from the usual two-wire illuminating circuit.

Within the outer jacket 12 there is arranged an inner container 16 having a thin wall of good heat conducting characteristics. Water is supplied to this inner container 16 through a valve-controlled pipe 17. A stand pipe 18 is arranged to maintain a constant liquid level L in the inner container 16, the stand pipe communicating with a drain 19. Within the inner container 16 there is arranged a pipe coil 20 whose lower end extends leaktight out through the outer receptacle 12 and is connected to a delivery pipe 21 which may lead to a suitable storage receptacle not shown. The space S above the body of liquid in the inner container 16 communicates by means of an aperture 18 in the wall of the inner container with a space 19 into which the upper end of the pipe coil 20 opens. Preferably, in order to insure a rapid flow of the vapor from the space S into the condensing pipe 18, an electric motor is mounted on the outer receptacle 12 and drives a fan 23 in the apertaure 18, thus rapidly drawing off the vapor from the space S and causing it to circulate through the pipe coil 20 which is immersed in the body of liquid in the inner container 16. The vapor is thus passed in heat-exchange relation to this body of liquid, and, since evaporation results from the surface heating only of this body of liquid, the vapor is rapidly condensed and the heat of condensation is imparted to the body of water in the inner container so that the heat of condensation is conserved and thus the heat supplied to the apparatus is used in the most effective way.

While certain desirable embodiments of the invention, in the form of apparatus, have herein been disclosed by way of illustration, it is to be understood that the invention as herein disclosed is to be regarded as broadly inclusive of any and all modifications, falling within the terms of the appended claims.

I claim:

A portable distilling apparatus comprising a receptacle having substantially cylindrical side walls and a bottom which is closed except for a single essentially central opening, a removable cover for the receptacle, said cover having double walls with heat insulation therebetween, an essentially cylindrical container for liquid within the receptacle with fully open top and essentially completely closed bottom and side walls spaced from the bottom and respective walls of the receptacle and forming with the inner surface of the receptacle a space which communicates freely with the space between said cover and the liquid at said open top of the container, emptying and level maintaining ducts leading from said container through said space and said receptacle without essentially obstructing said space, a stand for removably supporting said receptacle in elevated position, a collecting vessel within said stand having its top closely adjacent to the bottom wall and positioned to receive condensate from said receptacle through said central opening, and means for supplying heat to said receptacle consisting of an electrical source of radiant heat at said cover facing said open top of the container to radiate downwardly against the free surface of the liquid exposed thereto at the top, whereby the surface layer of the liquid is vaporized for condensation in said space and delivery through said drain into said collecting vessel.

BUTLER AMES.

REFERENCES CITED

The following references are of record in the file of this patent:

UNITED STATES PATENTS

| Number | Name | Date |
|---|---|---|
| 750,747 | Young | Jan. 26, 1904 |
| 849,579 | Siebel | Apr. 9, 1907 |
| 1,361,834 | De Baufre | Dec. 14, 1920 |
| 1,419,008 | Baum | June 6, 1922 |
| 1,966,938 | Stone | July 17, 1934 |
| 2,357,869 | Beckwith | Sept. 12, 1944 |
| 2,449,587 | Chambers | Sept. 21, 1948 |

FOREIGN PATENTS

| Number | Country | Date |
|---|---|---|
| 12,402 of 1888 | Great Britain | Feb. 5, 1889 |
| 110,821 | Great Britain | Nov. 8, 1917 |
| 820,705 | France | Aug. 9, 1937 |